United States Patent
Caruso et al.

(10) Patent No.: US 9,706,766 B2
(45) Date of Patent: Jul. 18, 2017

(54) ACTIVE SYSTEMS AND METHODS FOR PRODUCING ULTRASONIC SOUND EMISSIONS FROM WIND TURBINES

(71) Applicant: General Electric Company, Schenectady, NY (US)

(72) Inventors: Christopher Daniel Caruso, Greenville, SC (US); Kevin Wayne Kinzie, Spartanburg, SC (US); Dongjai Lee, Greer, SC (US); James Robert Tobin, Simpsonville, SC (US); Justin Richard Curtis, Simpsonville, SC (US); Jonathan Henry Zalar, Greer, SC (US)

(73) Assignee: General Electric Company, Schenectady, NY (US)

( * ) Notice: Subject to any disclaimer, the term of this patent is extended or adjusted under 35 U.S.C. 154(b) by 768 days.

(21) Appl. No.: 13/926,367

(22) Filed: Jun. 25, 2013

(65) Prior Publication Data

US 2014/0377061 A1 Dec. 25, 2014

(51) Int. Cl.
*F03D 11/00* (2006.01)
*A01M 29/18* (2011.01)
(Continued)

(52) U.S. Cl.
CPC .......... *A01M 29/18* (2013.01); *F03D 7/0264* (2013.01); *F03D 7/04* (2013.01); *F03D 17/00* (2016.05); *F03D 80/00* (2016.05); *Y02E 10/72* (2013.01)

(58) Field of Classification Search
CPC ....... A01M 29/18; F03D 7/04; F03D 11/0091
See application file for complete search history.

(56) References Cited

U.S. PATENT DOCUMENTS 3,157,153 A * 11/1964 Moe ............... A01M 29/18
                                                    116/137 A
3,516,384 A *  6/1970 Will .............. A01M 29/18
                                                    116/137 A
(Continued)

FOREIGN PATENT DOCUMENTS

DE            2339762 A1    7/1974
DE      102007025314 A1   12/2008
(Continued)

OTHER PUBLICATIONS

Moflon Technology, www.moflon.com/meph.html, 2011.*
(Continued)

*Primary Examiner* — Gregory Anderson
*Assistant Examiner* — Jason Fountain
(74) *Attorney, Agent, or Firm* — Dority & Manning, P.A.

(57) ABSTRACT

Methods for producing ultrasonic sound emissions from wind turbines, active systems for emitting ultrasonic sounds from wind turbines, and wind turbines are provided. In one embodiment, a method includes operating the wind turbine with an ultrasonic sound emitting device mounted on or within a component of the wind turbine, and receiving in a controller at least one indicator. The method further includes determining if an operating condition exists based on the at least one indicator, and supplying a fluid flow through an outlet of the ultrasonic sound emitting device such that an ultrasonic sound emission is produced by the ultrasonic sound emitting device if the operating condition exists.

19 Claims, 9 Drawing Sheets

(51) Int. Cl.
 F03D 7/02 (2006.01)
 F03D 7/04 (2006.01)
 F03D 80/00 (2016.01)
 F03D 17/00 (2016.01)

(56) References Cited

U.S. PATENT DOCUMENTS

| | | | |
|---|---|---|---|
| 3,831,548 A | 8/1974 | Droege | |
| 4,150,637 A * | 4/1979 | Penick | A01M 29/18 116/22 A |
| 6,250,255 B1 * | 6/2001 | Lenhardt | A01M 29/16 119/713 |
| 6,623,243 B1 | 9/2003 | Hodos | |
| 8,251,081 B2 * | 8/2012 | Hicks | G01F 13/006 137/1 |
| 8,727,741 B2 * | 5/2014 | Nutz | F04B 35/06 137/565.18 |
| 2005/0162978 A1 | 7/2005 | Lima | |
| 2008/0260531 A1 | 10/2008 | Stommel | |
| 2008/0298962 A1 | 12/2008 | Sliwa | |
| 2009/0185900 A1 | 7/2009 | Hirakata et al. | |
| 2009/0295165 A1 | 12/2009 | Giguere et al. | |
| 2010/0143121 A1 | 6/2010 | Haans et al. | |
| 2011/0192212 A1 | 8/2011 | Delprat et al. | |
| 2013/0050400 A1 * | 2/2013 | Stiesdal | F03D 11/00 348/36 |

FOREIGN PATENT DOCUMENTS

| | | |
|---|---|---|
| DE | 202010003983 U1 | 8/2010 |
| DE | 102010045238 A1 | 3/2012 |
| JP | 2009191807 A | 8/2009 |
| JP | 2009257322 A | 11/2009 |
| JP | 2010071100 A | 4/2010 |
| WO | WO 2010076500 A1 | 7/2010 |
| WO | 2012107195 A1 | 8/2012 |

OTHER PUBLICATIONS

European Search Report and Opinion issued in connection with corresponding EP Application No. 14172528.3 on Oct. 23, 2014.
Related U.S. Appl. No. 13/406,875, filed Feb. 28, 2012.
Related U.S. Appl. No. 13/753,957, filed Jan. 30, 2013.
Joseph M. Szewczak, PhD., Ultrasound emissions from wind turbines as a potential attractant to bats: a preliminary investigation. pp. 1-11; Humboldt State University, Arcata, CA; May 1, 2006.
Genevieve R. Spanjer, Responses of the big brown bat, *Eptesicus fusus*, to an acoustic deterrent device in a lab setting. pp. 1-12; University of Maryland; Dec. 2006.
Joseph M. Szewczak, PhD., Preliminary Field Results of an Acoustic Deterrent with the Potential to Reduce Bat Mortality from Wind Turbines. pp. 1-7; Humboldt State University, Arcata, CA; Aug. 23, 2006.
Joseph M. Szewczak, PhD., Field Test Results of a Potential Acoustic Deterrent to Reduce Bat Mortality from Wind Turbines. pp. 1-14; Humboldt State University, Arcata, CA; Oct. 18, 2007.
Jason W. Horn, Edward B. Arnett, Mark Jensen, Thomas H. Kunz, Testing the effectiveness of an experimental acoustic bat deterrent at the Maple Ridge wind farm. pp. 1-30; Bat Conservation International, Austin, TX; Jun. 24, 2008.
Edward B. Arnett, Michael Schirmacher, Effectiveness of Changing Wind Turbine Cut-in Speed to reduce Bat Fatalities at Wind Facilities, 2008 Annual Report. Bat Conservation International; pp. 2-44; Apr. 2009.
Edward B. Arnett, Michael Schirmacher, Effectiveness of Changing Wind Turbine Cut-in Speed to reduce Bat Fatalities at Wind Facilities, Final Report. Bat Conservation International; pp. 2-57; May 2010.
Edward B. Arnett, Cris Hein, Michael Schirmacher, Michael Baker, Evaluating the effectiveness of an ultrasonic acoustic deterrent for reducing bat fatalities at wind turbines, Final Report; pp. 2-45; Dec. 2011.
Edward B. Arnett, Manuela MP Huso, Michael Schirmacher, John Hayes, Frontiers in Ecology and the Environment; Altering Turbine speed reduces bat mortality at wind-energy facilities. pp. 2-8; 2010.
Wind Power and Wildlife in Colorado, Symposium and Workshop, Jan. 23-25, 2006, 27 pages.
10th Meeting of the Advisory Committee, Bratislava, Slovak Republic, Apr. 25-27, 2005, Report of the Intersessional Working Group on Wind Turbines and Bat Populations, 21 pages.
Erin F. Baerwald, et al., A Large-Scale Mitigation Experiment to Reduce Bat Fatalities at Wind Energy Facilities, Aug. 2009, 5 pages.
Dr. Hermann Hotker, et al., Auswirkungen regenerativer . . . , Dec. 2004, 80 pages.
"Scientists find successful way to reduce bat deaths at wind turbines," Sep. 28, 2009, http://www.physorg.com/news173364700.html.
"Bat deaths from wind turbines explained," Aug. 25, 2008, http://www.ucalgary.ca/news/aug2008/batdeaths.
Bats and Wind Energy Cooperative, Research, Operational Mitigation & Deterrents, 2008, http://www.batsandwind.org/main.asp?page=research&sub=operational.

\* cited by examiner

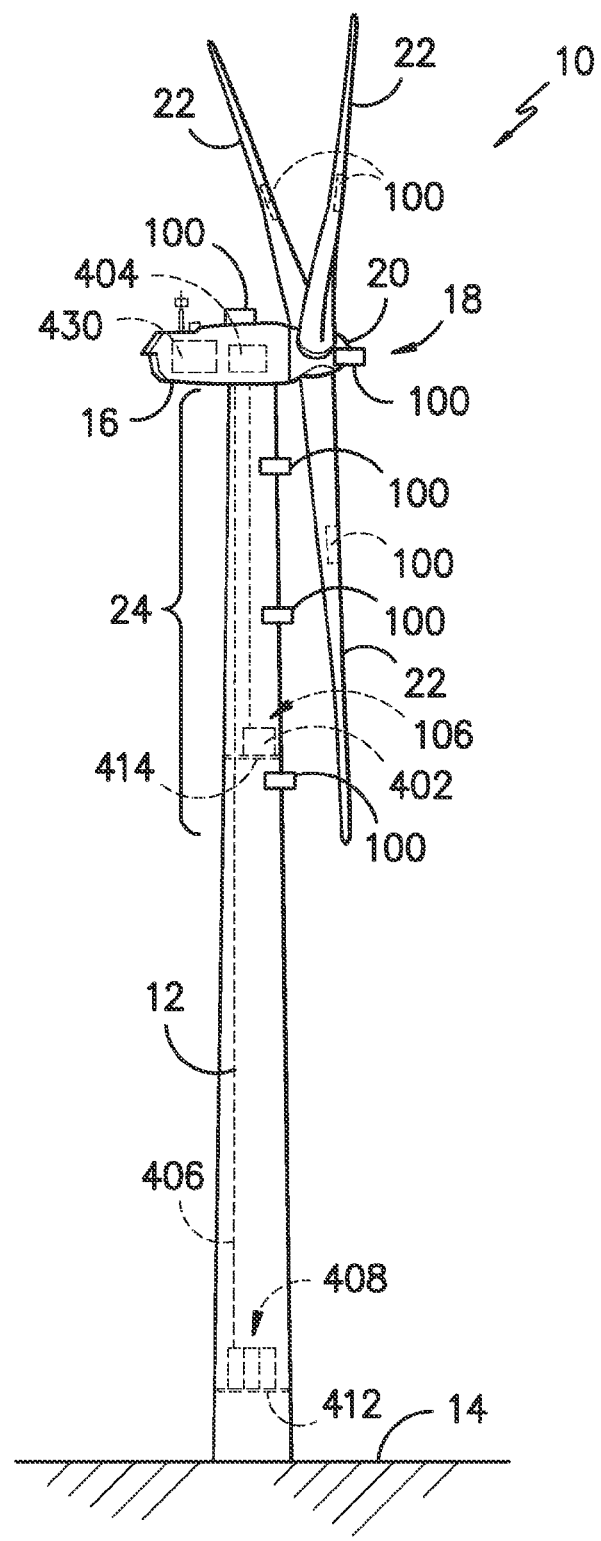
FIG. -1-

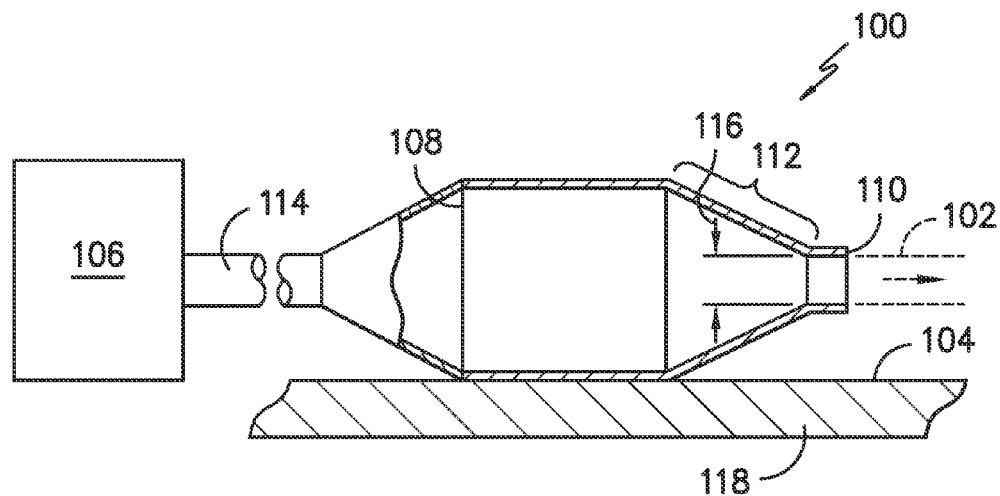
FIG. -2-
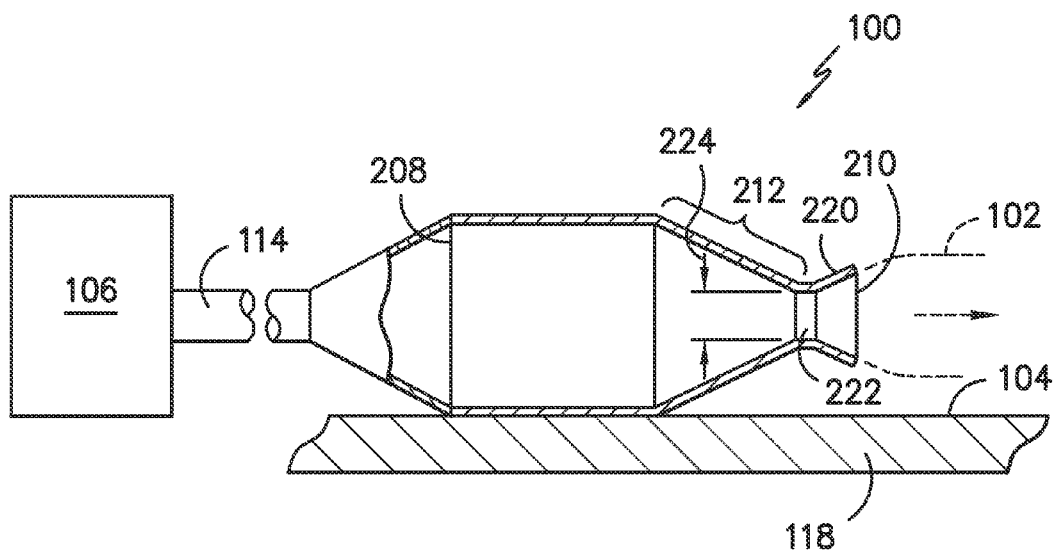
FIG. -3-

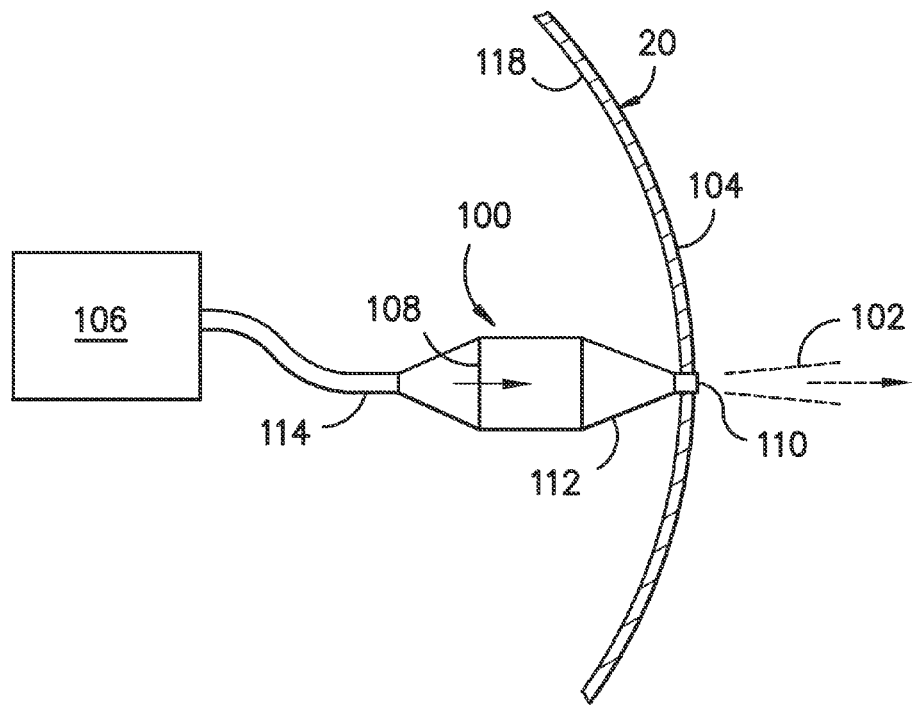
FIG. -4-
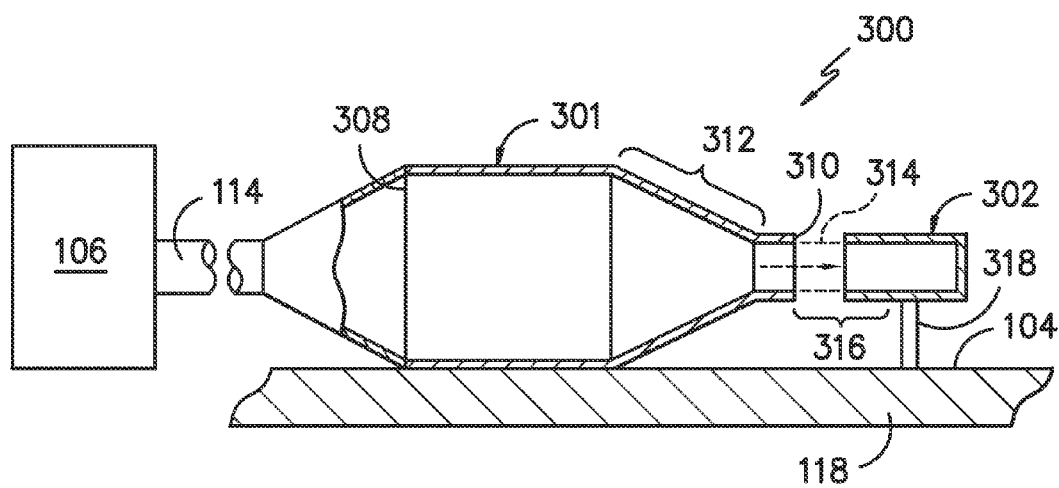
FIG. -5-

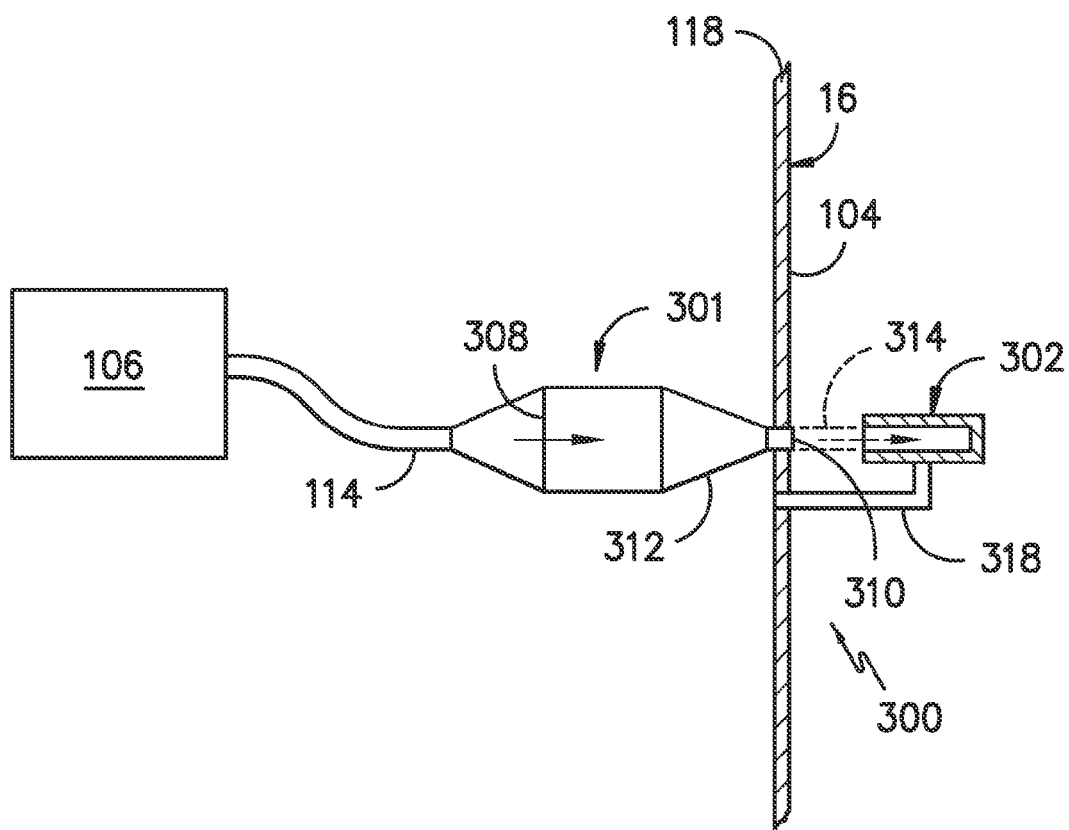
FIG. —6—

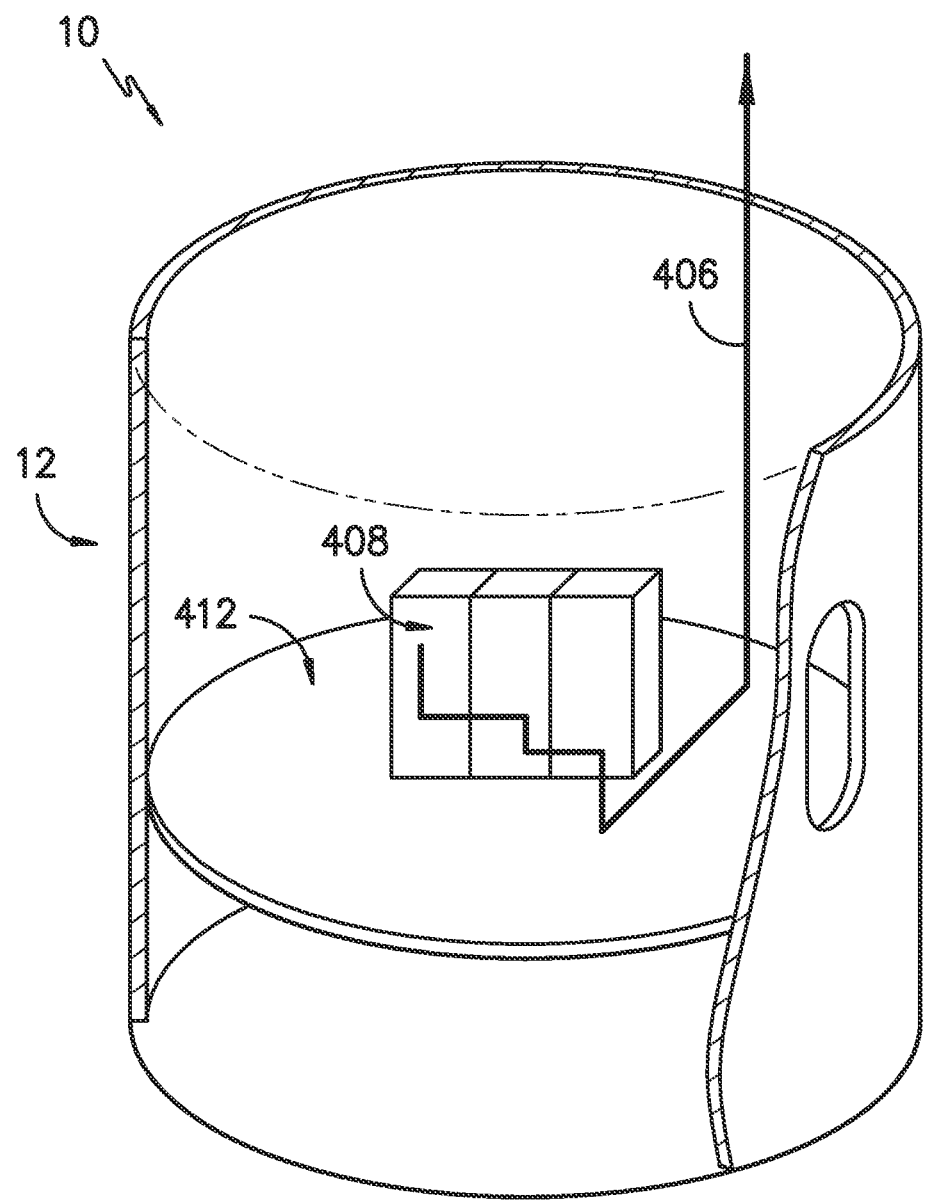
FIG. —7—

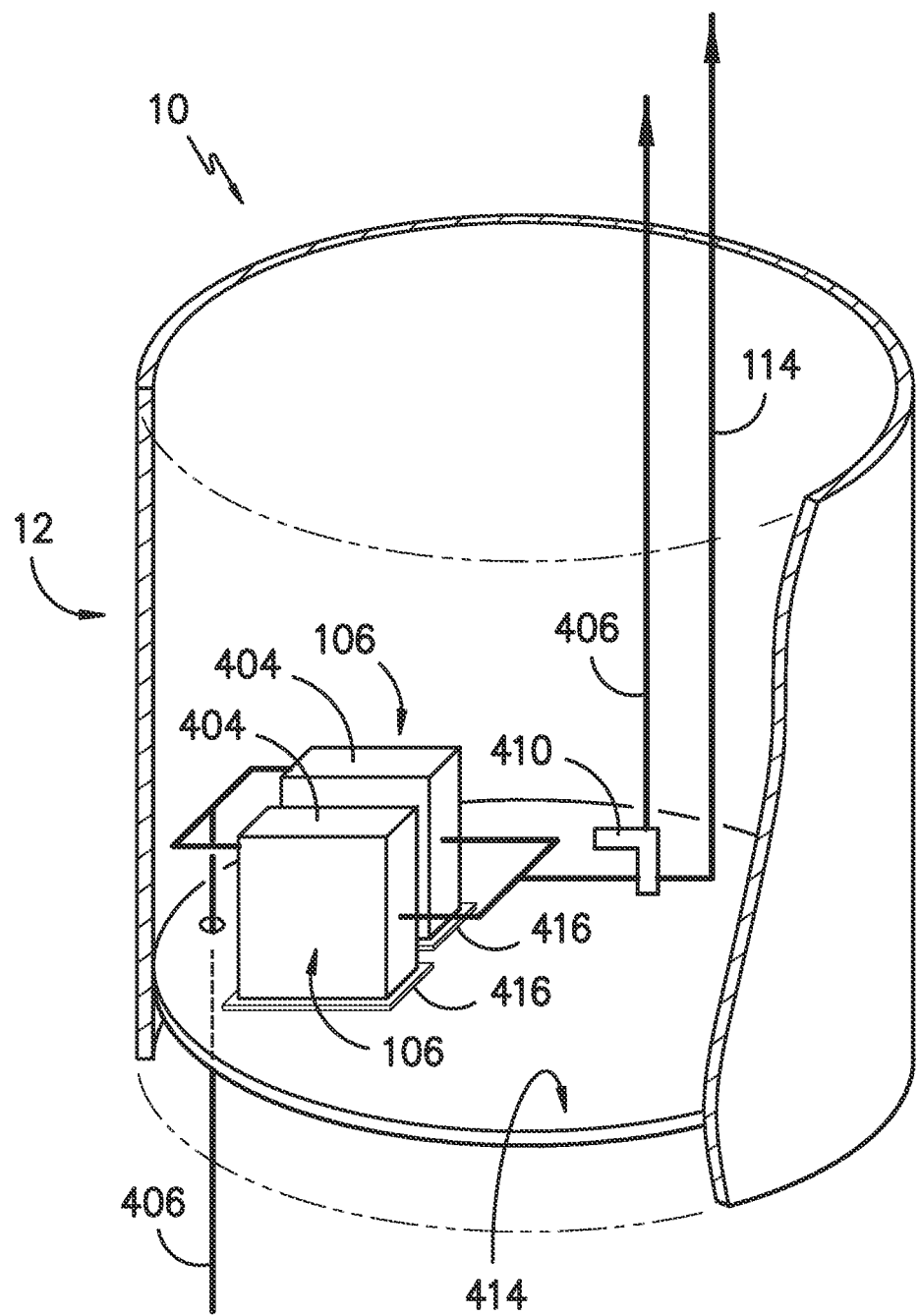
FIG. -8-

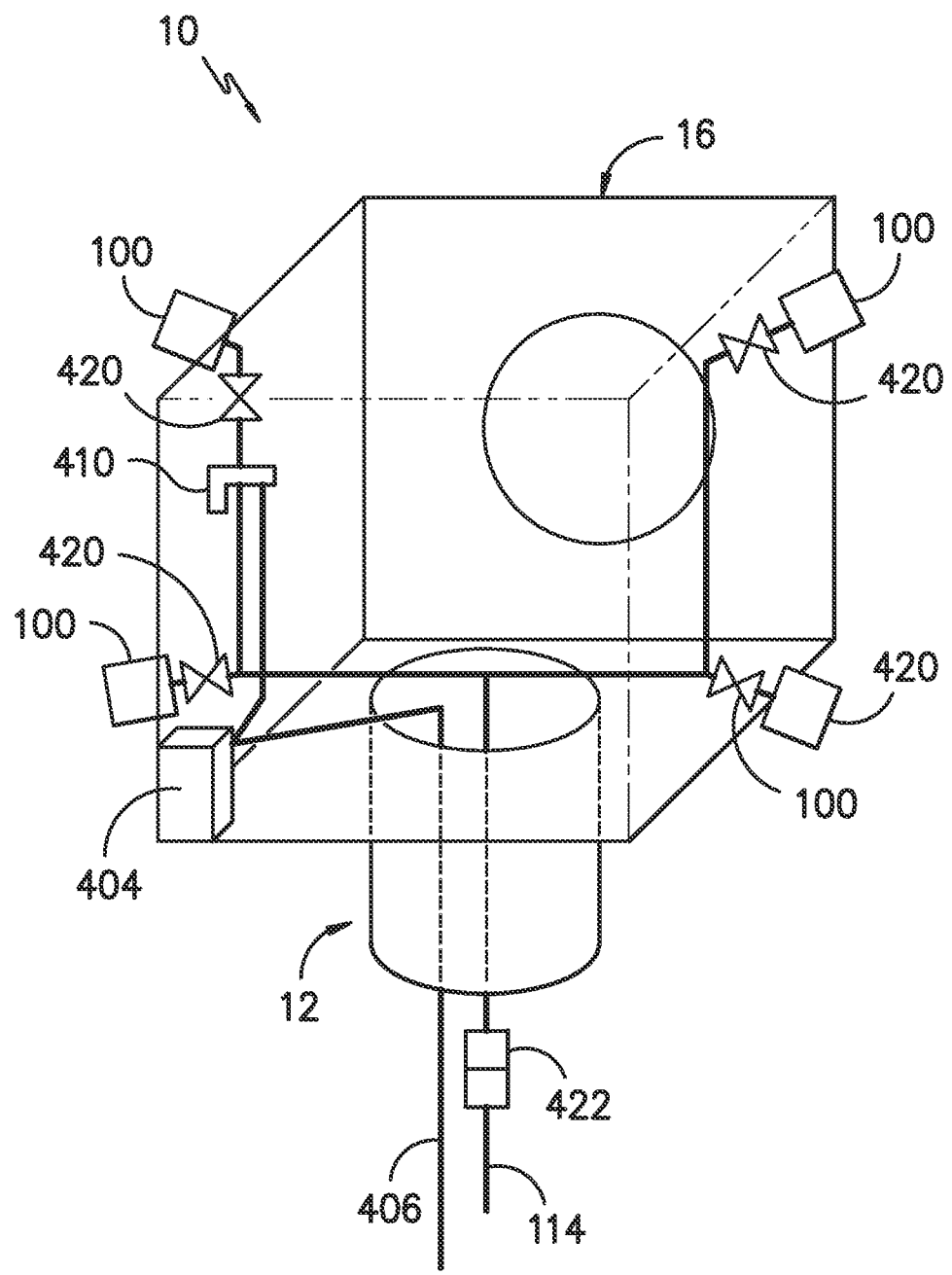
FIG. -9-

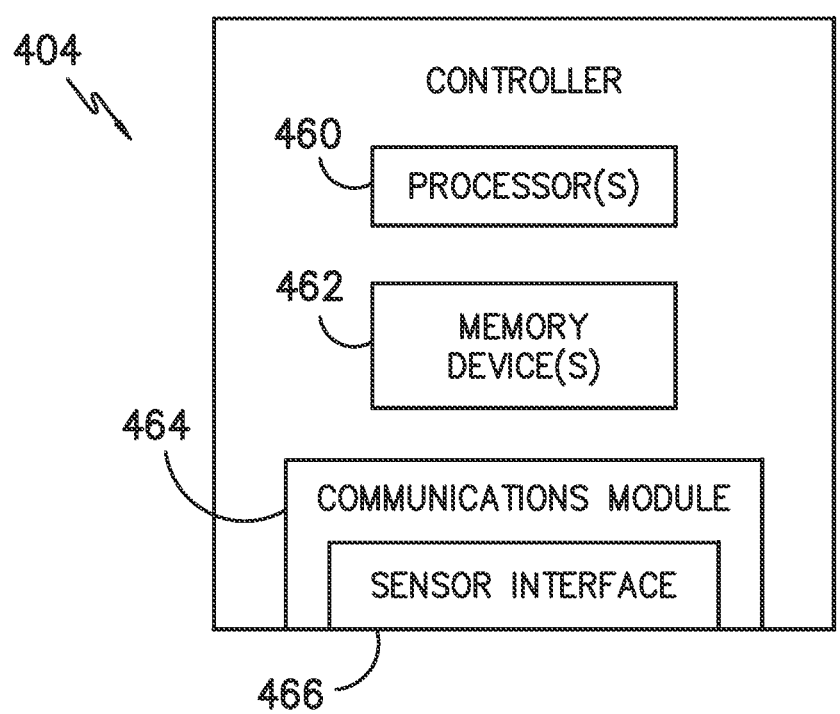
FIG. -10-

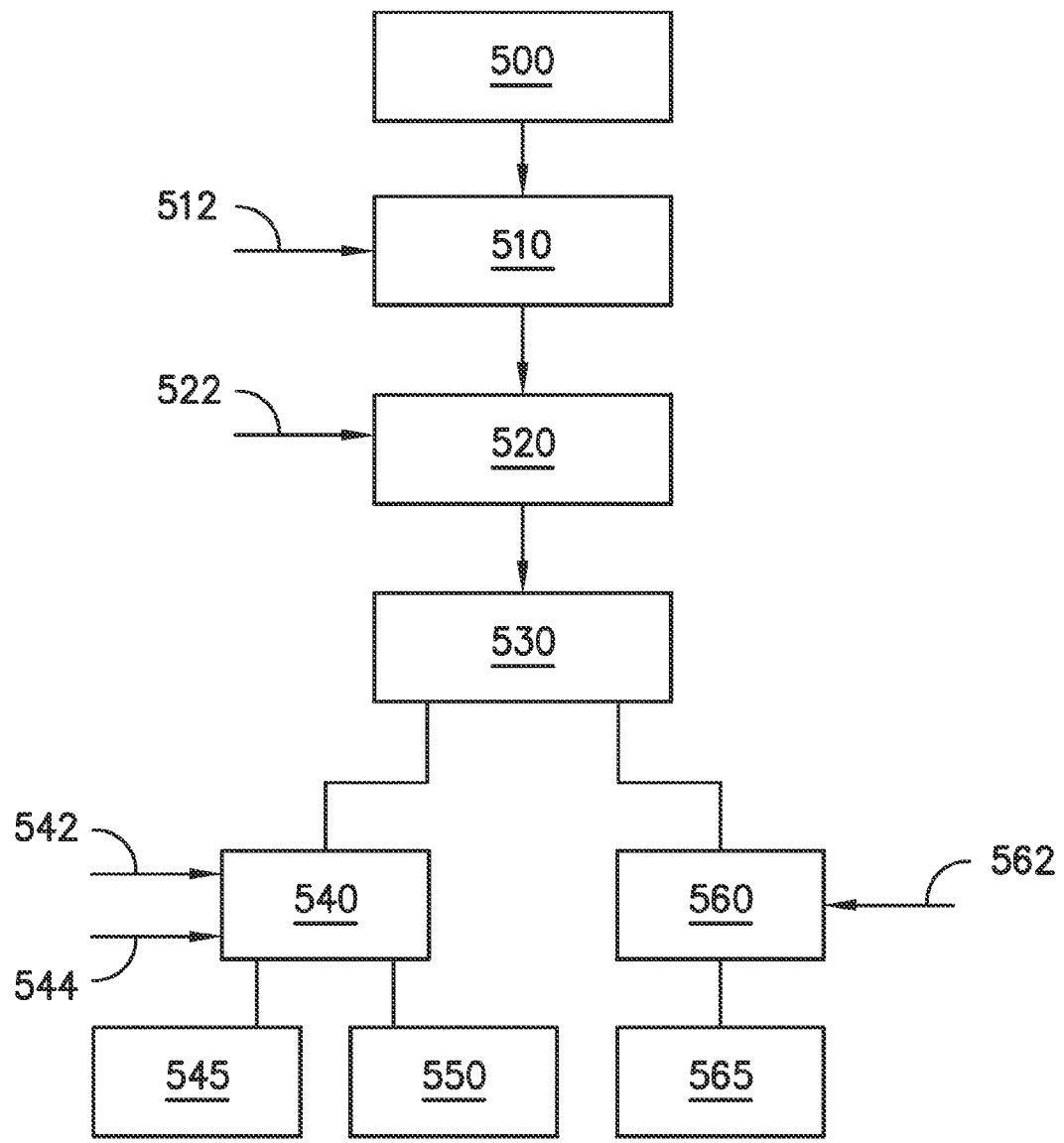
FIG. -11-

# ACTIVE SYSTEMS AND METHODS FOR PRODUCING ULTRASONIC SOUND EMISSIONS FROM WIND TURBINES

FIELD OF THE INVENTION

The present subject matter relates generally to wind turbines and, more particularly, to methods and apparatus for producing ultrasonic sound emissions from wind turbines to deter bats.

BACKGROUND OF THE INVENTION

Wind power is considered one of the cleanest, most environmentally friendly energy sources presently available, and wind turbines have gained increased attention in this regard. However, while being considered environmentally safe, wind turbines can pose a threat to bats. Specifically, it has been found that bats may have trouble detecting the rotating rotor blades of a wind turbine or may even be attracted to the wind turbine. As a result, bats can be struck by the rotor blades and killed. The occurrence of such bat strikes have led many to enact regulations and/or laws prohibiting and/or discouraging the placement of wind turbines in areas of high bat populations and/or restricting the operation of wind turbines at night.

Many believe that ultrasonic sound in the frequency range of about 25 kHz to about 100 kHz may be effective at deterring bats by interfering with both the bats' natural sonar and their ability to hunt insects. However, generating enough sound to cover the entire rotor diameter of a wind turbine has proven to be a difficult task. For example, previous attempts have focused on the use of speakers mounted on the nacelle. Unfortunately, due to dissipation of the sound, it has been found that nacelle mounted speakers do not provide for sufficient bat deterrence.

Accordingly, methods and apparatus for producing ultrasonic sound emissions that are capable of producing sufficient acoustic power to deter bats from a wind turbine would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a method for producing an ultrasonic sound emission from a wind turbine. The method includes operating the wind turbine with an ultrasonic sound emitting device mounted on or within a component of the wind turbine, and receiving in a controller at least one indicator. The method further includes determining if an operating condition exists based on the at least one indicator, and supplying a fluid flow through an outlet of the ultrasonic sound emitting device such that an ultrasonic sound emission is produced by the ultrasonic sound emitting device if the operating condition exists.

In another embodiment, the present disclosure is directed to an active system for emitting ultrasonic sounds from a wind turbine. The system includes an ultrasonic sound emitting device configured to be mounted on or within a component of the wind turbine, the ultrasonic sound emitting device including an inlet and an outlet, and a compressor in fluid communication with the ultrasonic sound emitting device, the compressor configured to supply a fluid flow to the ultrasonic sound emitting device. The system further includes a controller coupled to the ultrasonic sound emitting device and the compressor, the controller operable to determine if an operating condition exists based on at least one indicator and activate the compressor to supply the fluid flow to the ultrasonic sound emitting device if the operating condition exists. The ultrasonic sound emitting device is configured to accelerate the fluid flow derived from the compressor through the outlet such that an ultrasonic sound emission is produced by the ultrasonic sound emitting device.

In another embodiment, the present disclosure is directed to a wind turbine. The wind turbine includes a tower, a nacelle mounted on the tower, and a rotor coupled to the nacelle, the rotor including a hub and at least one rotor blade extending from the hub. The wind turbine further includes an ultrasonic sound emitting device mounted on or within one of the tower, the nacelle, the hub, or the at least one rotor blade, the ultrasonic sound emitting device including an inlet and an outlet, and a compressor in fluid communication with the ultrasonic sound emitting device, the compressor configured to supply a fluid flow to the ultrasonic sound emitting device. The wind turbine further includes a controller coupled to the ultrasonic sound emitting device and the compressor, the controller operable to determine if an operating condition exists based on at least one indicator and activate the compressor to supply the fluid flow to the ultrasonic sound emitting device if the operating condition exists. The ultrasonic sound emitting device is configured to accelerate the fluid flow derived from the compressor through the outlet such that an ultrasonic sound emission is produced by the ultrasonic sound emitting device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine having a plurality of ultrasonic sound emitting devices mounted on various components of the wind turbine;

FIG. 2 illustrates a cross-sectional view of one embodiment of an ultrasonic sound emitting device mounted to an exterior surface of a component of the wind turbine;

FIG. 3 illustrates a cross-sectional view of another embodiment of an ultrasonic sound emitting device mounted to an exterior surface of a component of the wind turbine;

FIG. 4 illustrates a partial, cross-sectional view of one embodiment of an ultrasonic sound emitting device mounted within a component of the wind turbine;

FIG. 5 illustrates a cross-sectional view of a further embodiment of an ultrasonic sound emitting device mounted to an exterior surface of a component of the wind turbine;

FIG. 6 illustrates a partial, cross-sectional view of another embodiment of an ultrasonic sound emitting device mounted within a component of the wind turbine;

FIG. 7 illustrates a partial internal view of one embodiment of a portion of a tower of a wind turbine;

FIG. 8 illustrates a partial internal view of one embodiment of another portion of a tower of a wind turbine;

FIG. 9 illustrates a partial internal view of one embodiment of a nacelle of a wind turbine;

FIG. 10 illustrates a schematic view of one embodiment of a controller for an active system for emitting ultrasonic sounds; and FIG. 11 illustrates a flow chart of one embodiment of a method for producing an ultrasonic sound emission.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a wind turbine including one or more ultrasonic sound emitting devices configured to produce sound at a frequency within the ultrasonic range (e.g., from about 25 kHz to about 100 kHz). In several embodiments, the ultrasonic sound emitting devices may be one or more nozzles mounted on and/or within one or more components of the wind turbine, such as the nacelle, tower, rotor blade and/or hub of the wind turbine. A pressurized fluid source may be in fluid communication with each nozzle such that a fluid flow (e.g., an airflow) is directed into the nozzle and is choked, thereby producing a fluid jet (e.g., a supersonic air jet) at the nozzle outlet that emits sound within the ultrasonic frequency range. It is believed that the ultrasonic sound emitted from the disclosed nozzles may deter bats from flying into and/or adjacent to a wind turbine.

It should be appreciated that the disclosed nozzles may be configured to continuously generate an ultrasonic sound emission during operation of a wind turbine. However, due to the fact that the fluid source may be electronically controlled, fluid may, in several embodiments, only be supplied to nozzles during certain operating periods (e.g., during nighttime operating hours) and/or the fluid may be pulsated through the nozzles such a pulsed or periodic ultrasonic sound emission is generated by the nozzles.

Further, the present disclosure is directed to active systems for emitting ultrasonic sounds from a wind turbine, and methods for producing ultrasonic sound emissions from a wind turbine. An active system may include, for example, a ultrasonic sound emitting device, a compressor, and a controller. The compressor may supply fluid flow to the nozzle, and the controller may regulate such fluid flow as desired. A method may include, for example, determining if an operating condition exists based on one or more indicators, and supplying the fluid flow through the nozzle if the operating condition exists.

Referring now to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced. It should be appreciated that, as used herein, the term "hub" may refer to the inner hub component (i.e., the component to which the rotor blades 22 are attached via the pitch bearings), the outer hub component (i.e., the component surrounding the inner hub—often referred to as the "spinner") or a combination of both the inner and outer hub components.

Additionally, in several embodiments, one or more ultrasonic sound emitting devices 100 may be mounted on and/or within one or more components of the wind turbine 10 to deter bats from flying into and/or adjacent to the wind turbine 10. As used herein, the term "component" generally refers to any component of the wind turbine 10, including, but are not limited to, the tower 12, the nacelle 16, the rotor blades 22 and the hub 20 of the wind turbine 10.

For example, as shown in FIG. 1, one or more ultrasonic sound emitting devices 100 may be mounted on and/or within the tower 12. It should be appreciated that, when mounting the ultrasonic sound emitting device(s) 100 on and/or within the tower 12, it may be desirable, in one embodiment, to position the device(s) 100 along an upper portion 24 of the tower 12 (i.e., the portion of the tower 12 across which the rotor blades 22 pass during operation of the wind turbine 10). However, in alternative embodiments, the ultrasonic sound emitting device(s) 100 may be mounted on/or within the tower 12 at any other suitable location along its length.

Moreover, one or more ultrasonic sound emitting devices 100 may also be mounted on and/or within the nacelle 16 at any suitable location. For example, as shown in FIG. 1, in one embodiment, an ultrasonic sound emitting device 100 may be mounted at the top of the nacelle 16. In another embodiment, one or more ultrasonic sound emitting devices 100 may be mounted on and/or within one of the sides of the nacelle 16, as shown in FIG. 9. Similarly, as shown in the illustrated embodiment, one or more ultrasonic sound emitting devices 100 may also be mounted on and/or within the hub 20 at any suitable location, such as at the front of the hub 20.

It should be appreciated that the specific placement and number of the ultrasonic sound emitting devices 100 shown in FIGS. 1 and 9 are simply provided as examples to illustrate how the disclosed devices 100 may be installed at different locations on and/or within the various components of the wind turbine 10. Thus, one of ordinary skill in the art should appreciate that, in general, any number of devices 100 (including a single device 100) may be positioned at any suitable locations on and/or within the wind turbine 10 in order to deter bats from flying into and/or adjacent to the wind turbine 10.

Referring now to FIG. 2, a cross-sectional view of one embodiment of an ultrasonic sound emitting device 100 is illustrated in accordance with aspects of the present subject matter. As shown, in several embodiments, the ultrasonic sound emitting device 100 may comprise a converging nozzle 100 mounted to an exterior surface 104 of a component of the wind turbine 10, such as the exterior surface 104 of the tower 12, the nacelle 16 and/or the hub 20. In general, the nozzle 100 may be configured to generate a fluid jet 102 (e.g., a supersonic air jet) as fluid flows through the nozzle 100. Thus, as shown in FIG. 2, the nozzle 100 may be in fluid communication with a suitable pressurized fluid source 106 such that a fluid flow may be directed through the nozzle 100. As will be described below, by appropriately selecting certain dimensions of the nozzle 100, the airflow through the nozzle 100 may be accelerated to the point of choking (i.e., at or above a speed of Mach 1), thereby producing a supersonic jet 102. As the fluid jet 102 exits the nozzle 100, a shock wave-expansion system (i.e., shock cells or a shock cell structure/pattern) is created such that, as the turbulence in the shear layers around the jet 102 interact with the shock cells, an ultrasonic sound emission may be generated within a frequency ranging from about 25 kHz to about 100 kHz.

As particularly shown in FIG. 2, the nozzle 100 may generally include an inlet 108, an outlet 110 and a converging section 112 extending between the inlet 108 and the outlet 110. The inlet 108 may generally be configured to be in fluid communication with the pressurized fluid source 106 to allow a pressurized flow of fluid to be supplied through the nozzle 100. For example, as shown in FIG. 2, the inlet 108 may in fluid communication with the fluid source 106 via a hose or other suitable fluid conduit 114. The converging section 112 may generally correspond to a portion of the nozzle 100 along which the cross-sectional area of the nozzle 100 steadily decreases between the inlet 108 and the outlet 110, thereby causing the air entering the inlet 108 to be accelerated as its flows through the converging section 112. Thus, by appropriately selecting the size of the outlet 110, the fluid flow through the converging section 110 may be choked as it reaches the outlet 110. As is generally understood, the cross-sectional area required to choke the fluid flow may generally vary depending on the total mass flow through the nozzle 100 and the total pressure of the flow. However, in several embodiments, the outlet 110 may have a diameter 116 ranging from about 1 millimeter (mm) to about 15 mm, such as from about 1 mm to about 5 mm or from about 5 mm to about 15 mm and all other subranges therebetween. However, it is foreseeable by the inventors of the present subject matter that the diameter 116 of the outlet 110 may be smaller and/or larger than the values contained within the ranges described above.

It should be appreciated that, in several embodiments, the diameter 116 of the outlet 110 may be selected so as to specifically tailor the frequency of the ultrasonic sound emission produced by the nozzle 100. For instance, in one embodiment, an outlet diameter 116 ranging from about 5 mm to about 15 mm may be utilized to produce ultrasonic sound at a frequency of about 25 kHz while an outlet diameter 116 ranging from about 1 mm to about 5 mm may be utilized to produce ultrasonic sound at a frequency of about 100 kHz. Accordingly, it may be desirable to position multiple nozzles 100 having different outlet diameters 116 at various locations on the wind turbine 10 such that ultrasonic sound emissions at different frequencies may be produced.

It should be appreciated that the nozzle 100 may generally be configured to be mounted to the exterior surface 104 using any suitable fastening means and/or method known in the art. As used herein, a nozzle 100 may be mounted to the exterior surface 104 of a component by being directly or indirectly coupled to such surface 104. Thus, in several embodiments, the nozzle 100 may be mounted to the tower 12, nacelle 16 or hub 20 using one or more suitable fastening mechanisms (e.g., screws, bolts, pins, rivets, and/or the like) and/or by using one or more coupling devices (e.g., brackets, frames, support members and/or the like).

Additionally, it should be appreciated that, in alternative embodiments, the nozzle 100 need not be configured as a converging nozzle. For example, in one embodiment, the nozzle 100 may simply be configured as a thin walled tube or orifice defining a constant diameter between the outlet 108 and the inlet 110.

Referring now to FIG. 3, a cross-sectional view of another embodiment of the nozzle 100 shown in FIG. 2 is illustrated in accordance with aspects of the present subject matter. As shown, the nozzle 100 may be configured as a de Laval or any other suitable convergent-divergent nozzle. Thus, in addition to having an inlet 208, an outlet 210 and a converging section 212, the nozzle 100 may also include a diverging section 220 extending between the converging section 212 and the outlet 210. In such an embodiment, a nozzle throat 222 may be located between the converging section 212 and the diverging section 220 and may define the point at which the cross-sectional area of the nozzle 100 transitions from decreasing (along the converging section 212) to increasing (along the diverging section 220).

By configuring the nozzle 100 in the manner shown in FIG. 3, the fluid flow may, for example, be accelerated to a supersonic speed as it flows through the converging section 212 and into the nozzle throat 222. Thus, similar to the outlet 110 described above, the size of the nozzle throat 222 may generally be selected based on the total mass flow through the nozzle 100 and the total pressure of the flow. For example, in several embodiments, the nozzle throat 222 may have a diameter 224 ranging from about 1 millimeter (mm) to about 15 mm, such as from about 1 mm to about 5 mm or from about 5 mm to about 15 mm and all other subranges therebetween. However, it is foreseeable by the inventors of the present subject matter that the diameter 224 of the nozzle throat 220 may be smaller and/or larger than the values contained within the ranges described above.

In addition, by configuring the nozzle 100 to include the diverging section 220, the fluid jet 102 traveling through the nozzle throat 222 may expand as it flows through the diverging section 220. Such expansion may generally allow the shape of fluid jet 102 to be modified as it exits through the outlet 210, thereby altering the frequency of the ultrasonic sound emitted by the nozzle 100. It should be appreciated that the diameter/cross-sectional area to which the nozzle 100 increases between the throat 222 and the outlet 210 may generally vary depending on the sound characteristics desired to be achieved, the dimensions of the nozzle throat 222 and/or various other parameters/conditions. However, in several embodiments, a ratio of the cross-sectional area of the outlet 210 to the cross-sectional area of the throat 222 may range from about 1:1 to about 1.2:1, such as from about 1.03:1 to about 1.1:1 or from about 1.1:1 to about 1.2:1 and all other subranges therebetween. However, it is foreseeable by inventors of the present subject matter that the ratio of the cross-sectional area of the outlet 210 to the cross-sectional area of the throat 222 may be smaller and/or larger than then values contained within the ranges described above.

It should be appreciated that, in addition to being mounted to an exterior surface 104 of one or more of the components of the wind turbine 10, the nozzles 100 described above may also be at least partially mounted within such component(s). For example, FIG. 4 illustrates the nozzle 100 shown in FIG. 2 mounted partially within the interior of the front portion of the hub 20. Specifically, as shown, the nozzle 100 may be mounted within the hub 20 such that the outlet 108 extends through a wall 118 of the hub 20 to its exterior surface 104. As such, the fluid jet 102 generated within the nozzle 100 may be expelled to the exterior of the hub 20, thereby ensuring that the ultrasonic sound emission generated as the jet 102 exits the nozzle 100 propagates outwardly from the hub 20.

Alternatively, as indicated above, the nozzles 100 may be mounted within any other suitable component of the wind turbine 10. For example, instead of being a wall 118 of the hub 20, the wall 118 shown in FIG. 4 may correspond to a wall 118 of the tower 12 and/or a wall 118 of the nacelle 16.

Referring now to FIG. 5, a cross-sectional view of another embodiment of an ultrasonic sound emitting device 300 that may be mounted to an exterior surface 104 of one or more of the components of the wind turbine 10 is illustrated in accordance with aspects of the present subject matter. As shown, the ultrasonic sound emitting device 300 may be configured as a Hartmann generator or any other suitable powered resonance tube. Thus, the device 300 may include both a converging nozzle 301 and a closed-end tube 302 disposed downstream of the nozzle 301.

In general, the nozzle 301 may be configured the same as or similar to the nozzle 100 described above with reference to FIG. 2. For example, as shown in FIG. 5, the nozzle 301 may include an inlet 308, an outlet 310 and a converging section 312 extending between the inlet 308 and the outlet 310. In addition, the nozzle 301 may in fluid communication with a suitable pressurized fluid source 106. As described above, the nozzle 301 may generally be configured to generate a fluid jet 314 (e.g., a supersonic air jet) as fluid flows through the nozzle 301.

Similar to various Hartmann generators and/or other powered resonance tubes known in the art, the closed-end tube 302 may generally be configured to have the same diameter and/or cross-sectional area as the nozzle outlet 310 and may be aligned with the outlet 310 such that the fluid jet 314 exiting the nozzle 301 is directed into the tube 302. Thus, by positioning the tube 302 relative to the outlet 310 so that the tube 302 is disposed within a compression region 316 of the shock cell structure/pattern created at the outlet 310 as the jet 314 exits the nozzle 301, a strong flow instability (including successive compression and expansion waves) may be created within the tube 302. As a result of such flow instability, an ultrasonic sound emission may be generated by the ultrasonic sound emitting device 300 at a frequency ranging from about 25 kHz to about 100 kHz.

It should be appreciated that the closed-end tube 302 may generally be mounted in alignment with the nozzle outlet 310 using any suitable attachment means known in the art. For example, as shown in FIG. 5, the tube 302 may be mounted to the exterior surface 104 using any suitable coupling 318 (e.g., a pin, bolt, rod and/or other suitable linkage) that permits the tube 302 to be positioned in alignment with the nozzle outlet 310. Alternatively, the tube 302 may be held in alignment with the nozzle outlet 310 via a coupling or linkage extending between the tube 302 and the nozzle 301.

Referring now to FIG. 6, the ultrasonic sound emitting device 300 shown in FIG. 5 is illustrated in a configuration in which the nozzle 301 is partially mounted through a wall 118 of one of the components of the wind turbine 10. Specifically, in the illustrated embodiment, the nozzle 301 is mounted within the nacelle 16 such that the outlet 310 extends through the wall 118 of the nacelle 16. As such, the fluid jet 314 generated within the nozzle 301 may be expelled to the exterior of the nacelle 16. Additionally, as shown, the closed-end tube 302 may be mounted outside the nacelle 16 (e.g., by using a suitable coupling 318) such that the tube 302 is generally aligned with the nozzle outlet 310. Thus, the fluid jet 314 generated by the nozzle 301 may be directed into the closed-end tube 302, thereby producing an ultrasonic sound emission propagating outwardly from the nacelle 16.

Alternatively, as indicated above, the nozzle 301 may be configured to be mounted within any other suitable component of the wind turbine 10. For example, instead of being a wall 118 of the nacelle 16, the wall 118 shown in FIG. 6 may correspond to a wall 118 of the tower 12 and/or a wall 118 of the hub 20.

It should be appreciated that the ultrasonic sound emissions produced by the disclosed nozzles may generally travel from the nozzles in a cone-shaped sound path. Thus, it may be desirable to orient the nozzles on a wind turbine 10 such that the sound emissions are directed towards the locations at which bats are to be deterred. For example, in one embodiment, the nozzles installed on a particular wind turbine 10 may be oriented such that the sound emissions are directed toward the front of the wind turbine 10 (i.e., along the side of the nacelle 16 at which the rotor blades 22 are located).

It should also be appreciated that, although the present subject matter has been described herein as using nozzles to produce ultrasonic sound emissions, various other ultrasonic sound emitting devices may also be used to deter bats from a wind turbine 10. For example, in one embodiment, a speaker capable of producing ultrasonic sound emissions may be mounted on and/or within one or more of the components of the wind turbine 10. Alternatively, various other devices, such as a powered Helmholtz resonator, a dual bi-morph synthetic jet and/or the like, may be mounted on or within one or more of the components in order to produce ultrasonic sound emissions.

Moreover, although the present subject matter has been described primarily as using nozzles to produce a supersonic fluid jet, ultrasonic sound emissions may also be produced with sub-sonic fluid jets. Thus, it should be appreciated that the disclosed subject matter may generally be utilized to generate any suitable fluid jet that is capable of producing an ultrasonic sound emission.

The present disclosure is further directed to active systems for emitting ultrasonic sounds from wind turbines 10, and to methods for producing ultrasonic sound emissions from wind turbines 10. Referring to FIGS. 7 through 9, a system may include, for example, an ultrasonic sound emitting device 100, 300, which may include a nozzle 100, 301 as discussed above. An active system may further include a pressurized fluid source 106, which in exemplary embodiments is a compressor 402 as shown, such as an air compressor, in fluid communication with the ultrasonic sound emitting device 100. It should be appreciated that the pressurized fluid source 106 may generally comprise any suitable device, container, vessel and/or the like that contains pressurized fluid and/or allows for the pressurized fluid (e.g., pressurized air) to be supplied to the ultrasonic sound emitting device 100. Further, when the system includes multiple ultrasonic sound emitting devices 100, each ultrasonic sound emitting device 100 may be in fluid communication with a single fluid source 106 or multiple fluid sources 106 may be utilized to supply pressurized fluid to the ultrasonic sound emitting devices 100.

Additionally, it should be appreciated that, in several embodiments, the pressurized fluid source 106 may be configured to supply fluid to the ultrasonic sound emitting device 100 at a constant pressure or at a variable pressure.

For example, in a particular embodiment, the fluid source 106 may be configured to module the pressure of the fluid supplied to the ultrasonic sound emitting device 100 in order to modulate the frequency of the ultrasonic sound emission produced by the ultrasonic sound emitting device 100. Such modulation of the fluid pressure may, in several embodiments, be regulated via a controller 404 commutatively coupled to the fluid source 106, thereby allowing the frequency of the ultrasonic sound emission to be automatically increased or decreased as the pressure is adjusted.

It should also be appreciated that the pressurized fluid source 106 may generally be configured to be positioned at any suitable location relative to the ultrasonic sound emitting device 100. For example, in one embodiment, the fluid source 106 may be configured to be mounted to the exterior surface 104 adjacent to the location of the ultrasonic sound emitting device 100. In another embodiment, the fluid conduit 114 coupling the fluid source 106 to the ultrasonic sound emitting device 100 may extend through a wall 118 of the component (e.g., a wall 118 of the tower 12, the nacelle 16, rotor blade 22 and/or the hub 20) such that the fluid source 106 may be housed within the interior of such component. In other embodiments, the fluid source 106 may be disposed at any other suitable location relative to the ultrasonic sound emitting device 100. For instance, the fluid source 106 may be located on the support surface 14 or ground adjacent to the wind turbine 10 and the fluid conduit 114 may be configured to extend between the ultrasonic sound emitting device 100 and the fluid source 106 along the interior of the wind turbine 10 (e.g., through the interior of the tower 12, the nacelle 16, the rotor blade 22 and/or the hub 20) or along the exterior of the wind turbine 10.

FIGS. 1 and 8 illustrate compressors 402 in accordance with various embodiment of the present disclosure. As shown, each compressor 402 is in fluid communication with a ultrasonic sound emitting device 100 and configured to supply a fluid flow to the ultrasonic sound emitting device 100. For example, fluid conduit 114 may extend between each compressor 402 and a ultrasonic sound emitting device 100. As shown, conduits 114 extending from compressors 402 may converge and merge into a single conduit 114 for supply to one or more ultrasonic sound emitting devices 100. Further, referring to FIG. 9, a single conduit 114 may diverge into multiple conduits 114 for supply to one or more ultrasonic sound emitting devices 100. Further, electrical conduits 406 may extend to and from compressors 402 to power the compressors 402. As illustrated in FIGS. 1 and 7 through 9, in some embodiments, electrical conduits 406 may extend between compressors 402 and a down tower electrical assembly 408, to supply power from the assembly 408 to the compressors 402. Further, electrical conduits 406 may extend between the compressors 402 and the controller 404 and/or to/from other suitable components, such as transducers 410, to power these components. It should be understood, however, that the present disclosure is not limited to the use of assemblies 408 to power the various components of the system. Rather, for example, an external power source, which may be external to the wind turbine 10, may be utilized, or for example a compressor 402 may be directly coupled to the wind turbine 10, such as to an output shaft thereof, to receive power therefrom.

In exemplary embodiments, as illustrated in FIGS. 7 through 9, various of the system components may be disposed within the tower 12 of the wind turbine 10. For example, as illustrated the compressor 402 may be disposed within the tower 12. Tower 12 may include one or more platforms, such as for example a lower platform 412 and an upper platform 414 as shown. Down tower electrical assembly 408 may be disposed on a platform, such as on lower platform 412. Compressor 402 may be disposed on a platform, such as on upper platform 414. Alternatively, the compressor 402 may be disposed in any suitable location such as within the nacelle 16.

Various devices may be utilized to position a compressor 402 within the tower 12, such as on a platform. As shown, in some exemplary embodiments, a damper layer 416 may be provided between a compressor 402 and the platform. The damper layer 416 may be formed from, for example, rubber or another suitable compliant material. The damper layer 416 may serve to reduce or isolate vibration of the compressor 402, thus reducing transmission thereof to the platform and tower 12, etc.

Additionally or alternatively, a compressor 402 may be mounted through the use of, for example, fasteners, such as blind fasteners that do not require access to the underside of, for example, the associated platform, or nut/bolt combinations, rivets, screws, or other suitable mechanical fasteners. Alternatively, a compressor 402 may be mounted through welding or another suitable fastening process. In further alternative embodiments, a compressor 402 may be mounted through the use of brackets or a mounting box which surrounds the compressor 402, such that the compressor 402 is indirectly mounted. In still further alternative embodiments, a compressor 402 may be suspended above a mounting surface, such as a platform, through the use of ropes, cables, etc. These embodiments may further reduce the transmission of vibrations from the compressor 402.

An active system according to the present disclosure may further include various components between a compressor 402 and ultrasonic sound emitting device 100 for facilitating desired fluid flow to and from the ultrasonic sound emitting device 100. For example, as mentioned above, a transducer 410 may be mounted between a ultrasonic sound emitting device 100 and a compressor 402, such as to the fluid conduit 114 extending therebetween. The transducer 410 may, for example, monitor an operating variable such as pressure or flow rate of the fluid flow during operation. A transducer 410 may be mounted, for example, at the compressor 402 outlet, at the ultrasonic sound emitting device 100 inlet, or at any suitable location along the fluid conduit 114 therebetween.

Further, a valve 420 may be mounted between the ultrasonic sound emitting device 100 and compressor 402, such as to the fluid conduit 114 extending therebetween. The valve 420 may regulate the fluid flow therethrough, and may for example provide the fluid flow from a compressor 402 to a ultrasonic sound emitting device 100 at a predetermined pulse rate. In some exemplary embodiments, for example, a valve 420 may be a solenoid valve.

Still further, a slip ring 422, such as a pneumatic slip ring, may be mounted between the ultrasonic sound emitting device 100 and compressor 402, such as to the fluid conduit 114 extending therebetween. The slip ring 422 may provide the fluid communication between the ultrasonic sound emitting device 100 and compressor 402. For example, the slip ring 422 may connect portions of the fluid conduit 144, and allow movement of the ultrasonic sound emitting device 100 relative to the compressor 402 while maintaining the fluid communication therebetween. This is particularly advantageous when a ultrasonic sound emitting device 100 is mounted on or within, for example, the nacelle 16, the hub 20, or a rotor blade 22.

As mentioned, an active system according to the present disclosure may further include a controller 404. The controller 404 may be coupled to the ultrasonic sound emitting devices 100 and compressors 402, and may be operable to activate the compressors 402 to supply fluid flows to the ultrasonic sound emitting devices 100 as desired or required. In some exemplary embodiments, as shown, the controller 404 may be separate from a turbine controller 430 of the wind turbine 10. The turbine controller 430 may generally control various functions of the wind turbine 10, such as of the rotor blades 22, hub 20, nacelle 16, generator (not shown), etc. For example, the turbine controller 430 may control pitching of the rotor blades 22, yaw movements of the nacelle 16, and rating of the generator. The controller 404 of an active system according to the present disclosure may in exemplary embodiments be a separate component from the turbine controller 430, and may thus operate independently from the controller 430 to control the compressors 402 and other suitable components of the system. Thus, in these embodiments, the system may be utilized as an after-market, add-on, or retrofit system for an existing wind turbine 10, which can operate independently of the wind turbine 10 operation. Alternatively, however, controller 404 may be a component of the controller 430, and/or the system may be integrated with the wind turbine 10 in general.

As discussed, the controller 404 may generally control operation of the active system, and may further receive, analyze, and process information from various other components of the system in general. It should be appreciated that the controller 404 may generally comprise a computing device, such as a computer or any other suitable processing unit. Thus, in several embodiments, the controller 404 may include one or more processor(s) and associated memory device(s) configured to perform a variety of computer-implemented functions, as shown in FIG. 10 and discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 404 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 404 to perform various computer-implemented functions including, but not limited to, performing proportional integral derivative ("PID") control algorithms, including various calculations within one or more PID control loops, and various other suitable computer-implemented functions, such as those discussed herein. In addition, the controller 404 may also include various input/output channels for receiving inputs from sensors and/or other measurement devices and for sending control signals to various other components of the wind farm 10.

Referring now to FIG. 10, there is illustrated a block diagram of one embodiment of suitable components that may be included within the controller 404 in accordance with aspects of the present subject matter. As shown, the controller 404 may include one or more processor(s) 460 and associated memory device(s) 462 configured to perform a variety of computer-implemented functions (e.g., performing the methods, steps, calculations and the like disclosed herein). Additionally, the controller 404 may also include a communications module 464 to facilitate communications between the controller 404 and the various other components of the active system. Moreover, the communications module 464 may include a sensor interface 466 (e.g., one or more analog-to-digital converters) to permit input signals transmitted from, for example, various sensors, to be converted into signals that can be understood and processed by the processors 460.

Referring now to FIG. 11, the present disclosure is further directed to methods for producing ultrasonic sound emissions from wind turbines 10. A method may include, for example, the step 500 of operating the wind turbine 10. One or more ultrasonic sound emitting devices 100, 300, which may each include a ultrasonic sound emitting device 100 100, 301 as discussed above, may be mounted on or within a component of the wind turbine 10 as discussed above. Operation of the wind turbine 10 may include, for example, movement of the rotor blades 22, etc.

A method according to the present disclosure may further include, for example, the step 510 of receiving in a controller 404 at least one indicator 512. An indicator 512 is generally a monitored or historical condition, such as an environmental condition, that, depending on the state of the condition, may provide an indication that bats are more likely to be present at or near the wind turbine 10. For example, suitable indicators 512 include temperature, wind speed, time, date, air density, and humidity. With respect to wind speed, wind speeds of below approximately 7 meters per second may indicate the likelihood of bats being present. With respect to date, various months, such as between July and September, may indicate the likelihood of bats being present due to migration season. Suitable sensors mounted on or near the wind turbine 10 may measure one or more of these indicators 512, and may transmit these measurements to the controller 404. Other suitable indicators 512 include, for example, historical migration data. Another suitable indicator 512 is the output of a commercial bat detector, such as an Anabat or ReBAT system, or a custom-designed bat detection system. The controller 512 may receive signals from the sensors, etc., of the indicators 512, as measurements thereof, in real time as environmental conditions, etc. change during operation of the wind turbine 10, or may receive historical indicator 512 data or have historical indicator 512 data stored therein.

A method according to the present disclosure may further include, for example, the step 520 of determining if an operating condition 522 exists based on the at least one indicator 512. An operating condition 522 may be, for example, a net or overall indication, based on the indicators 512, that bats are likely to be present at or near the wind turbine 10. The controller 404 may be utilized to perform such determination. Accordingly, suitable algorithms may be provided in the controller 404 to perform such determination based on the indicators 512.

A method according to the present disclosure may further include, for example, the step 530 of supplying a fluid flow through the outlet 110, 210, 310 of one or more ultrasonic sound emitting devices 100 such that an ultrasonic sound emission is produced, as discussed above, if an operation condition 522 exists. Thus, if, for example, it is determined by the controller 404 that an operating condition 522 exists such that it is more likely than not that bats are present at or near the wind turbine 10, the controller 404 may send signals to the compressor 402 to activate the compressor 402, such that fluid flow is supplied to and through one or more ultrasonic sound emitting devices 100, as discussed above. If an operating condition 522 does not exist or ceases to exist, the fluid flow may not be supplied or may cease to be supplied.

The fluid flow may be supplied generally continuously or at a predetermined pulse rate, as desired or required. Further, it should be understood that each ultrasonic sound emitting device 100, 300, may be independently operated to supply a fluid flow. Thus, the flows from each ultrasonic sound emitting device 100 may be the same or different. Further, the flows through the ultrasonic sound emitting devices 100, 300 may, if desired, be coordinated such that various ultrasonic sound emitting devices 100, 300 emit sounds at various times, which may for example alternate or otherwise operate in a desired pattern. Various components, such as the compressors 402, controller 404, valves 420, etc., may regulate such fluid flows. It should further be understood that any suitable operation of one or more ultrasonic sound emitting devices 100, 300 to produce ultrasonic sound emissions is within the scope and spirit of the present disclosure.

In some embodiments, a method according to the present disclosure may include the step 540 of determining if one or more operating variables 542 for the fluid flow is within predetermined variable ranges 544. An operating variable 542 may, for example, be a state at which the fluid flow to and/or through one or more ultrasonic sound emitting device 100s 100, 300 is flowing. Suitable operating variables 542 include, for example, pressure of the fluid flow or flow rate of the fluid flow. Such operating variables 542 may be measured by suitable sensors, such as for example transducers 410. A suitable variable range 544 for, for example pressure may be between approximately 31 pounds per square inch gauge ("psig") and approximately 60 psig. The sensors, such as the transducers 410, may be in communication with the controller 404, such that the controller 404 compares the data for operating variables with the predetermine variable ranges 544 and determines if the operating variables 542 are within the predetermined variable ranges 544 for each operating variable 542. A method according to the present disclosure may further, for example, include the step 545 of adjusting supply of the fluid flow to one or more ultrasonic sound emitting devices 100, 300 if one or more operating variables 542 are outside of the associated predetermined variable ranges 544. For example, if pressure, flow rate, or another suitable operating variable 542 for a fluid flow exceeded or became less than the predetermined variable range 544, the controller 404 may send signals to the compressor 402 to adjust operation of or deactivate the compressor 402, or otherwise adjust fluid flow to the ultrasonic sound emitting devices 100, 300. Such predetermined variable ranges 544 may in exemplary embodiments be ranges in which the resulting emission from the ultrasonic sound emitting devices 100, 300 is a suitable or desired ultrasonic sound emission. Thus, the supply may be adjusted such that the operating variables 542 are within the associated predetermined variable ranges 544, or may be adjusted such that the supply of fluid flow is ceased.

Additionally or alternatively, a method according to the present disclosure may further include, for example, the step 550 of shutting down the wind turbine 10 if one or more operating variables 542 are outside of the associated predetermined variable range 544. For example, in some cases, when an operating variable 552 is outside of a predetermined variable range 544 and fluid flow thus must be adjusted, bats may remain present at or near the wind turbine 10. To reduce or prevent bat injury and wind turbine 10 interference, the wind turbine 10 may thus be required to be shut down until the bats are no longer present. Thus, in some cases, the wind turbine 10 may be shut down. For example, the controller 404 may communicate with the turbine controller 430, such that the turbine controller 430 initiates conventional wind turbine 10 shut down sequences or operations.

In some embodiments, a method according to the present disclosure may further include the step 560 of determining if the ultrasonic sound emissions from the one or more ultrasonic sound emitting devices 100, 300 are within a predetermined emission range 562. For example, suitable sensors mounted on or near the wind turbine 10 may detect the ultrasonic sound emissions emitted by the ultrasonic sound emitting devices 100, 300. The sensors may be in communication with the controller 404, and may provide this data to the controller 404, which may compare the actual emissions with the desired predetermined emission range 562. A suitable predetermined emission range 562 may, for example, be between approximately 20 kHz and approximately 100 kHz or between approximately 50 dB and approximately 80 dB. A method according to the present disclosure may further, for example, include the step 565 of adjusting supply of the fluid flow to one or more ultrasonic sound emitting devices 100, 300 if the ultrasonic sounds emissions are outside of the associated predetermined emission range 562. For example, if an ultrasonic sounds emission is outside of an associated predetermined emission range 562, the controller 404 may send signals to the compressor 402 to adjust operation of or deactivate the compressor 402, or otherwise adjust fluid flow to the ultrasonic sound emitting devices 100, 300. Thus, the supply may be adjusted such that the ultrasonic sound emissions are within the associated predetermined emission ranges 562, or may be adjusted such that the supply of fluid flow is ceased.

Additionally or alternatively, a method according to the present disclosure may further include, for example, the step of shutting down the wind turbine 10 if an ultrasonic sound emission is outside of the associated predetermined emission range 562. For example, in some cases, when an ultrasonic sound emission is outside of a predetermined emission range 562 and fluid flow thus must be adjusted, bats may remain present at or near the wind turbine 10. To reduce or prevent bat injury and wind turbine 10 interference, the wind turbine 10 may thus be required to be shut down until the bats are no longer present. Thus, in some cases, the wind turbine 10 may be shut down. For example, the controller 404 may communicate with the turbine controller 430, such that the turbine controller 430 initiates conventional wind turbine 10 shut down sequences or operations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for producing an ultrasonic sound emission from a wind turbine, the method comprising:
   operating the wind turbine with an ultrasonic sound emitting device mounted on or within a component of the wind turbine, the ultrasonic sound emitting device having an inlet, an outlet, and a converging section extending between the inlet and the outlet, the inlet, the outlet and the converging section being defined by outer walls of the ultrasonic sound emitting device;

receiving in a controller at least one indicator;

determining if an operating condition exists based on the at least one indicator;

supplying a fluid flow to the inlet of the ultrasonic sound emitting device via a fluid source at a predetermined pulse rate; and producing the ultrasonic sound emission via the ultrasonic sound emitting device by delivering the fluid flow through the outlet of the ultrasonic sound emitting device if the operating condition exists.

2. method of claim 1, further comprising:

determining if an operating variable for the fluid flow is within a predetermined variable range; and adjusting supply of the fluid flow if the operating variable is outside of the predetermined variable range.

3. The method of claim 2, wherein the operating variable is pressure of the fluid flow.

4. The method of claim 2, wherein the operating variable is flow rate of the fluid flow.

5. The method of claim 2, further comprising shutting down the wind turbine if the operating variable is outside of the predetermined variable range.

6. The method of claim 1, further comprising:

determining if the ultrasonic sound emission is within a predetermined emission range; and adjusting supply of the fluid flow if the ultrasonic sound emission is outside of the predetermined variable range.

7. The method of claim 1, wherein the at least one indicator is one of temperature, wind speed, time, date, air density, or humidity.

8. The method of claim 1, wherein a plurality of ultrasonic sound emitting devices are mounted on or within at least one component of the wind turbine, and wherein the supplying step comprises supplying a fluid flow through an outlet of each of the plurality of ultrasonic sound emitting devices such that an ultrasonic sound emission is produced by each of the plurality of ultrasonic sound emitting devices if the operating condition exists.

9. The method of claim 8, wherein each of the plurality of ultrasonic sound emitting devices is independently operated to supply a fluid flow.

10. An active system for emitting ultrasonic sounds from a wind turbine, the system comprising:

a ultrasonic sound emitting device configured to be mounted on or within a component of the wind turbine, the ultrasonic sound emitting device including an inlet, an outlet, and a converging section extending between the inlet and the outlet, the inlet, the outlet and the converging section being defined by outer walls of the ultrasonic sound emitting device;

a compressor in fluid communication with the ultrasonic sound emitting device, the compressor configured to supply a fluid flow to the inlet of the ultrasonic sound emitting device; and a controller coupled to the ultrasonic sound emitting device and the compressor, the controller operable to determine if an operating condition exists based on at least one indicator and to activate the compressor to supply the fluid flow to the inlet of the ultrasonic sound emitting device at a predetermined pulse rate if the operating condition exists, wherein the ultrasonic sound emitting device is configured to accelerate the fluid flow derived from the compressor through the converging section and the outlet such that an ultrasonic sound emission is produced by the ultrasonic sound emitting device.

11. The active system of claim 10, wherein the component of the wind turbine is a nacelle.

12. The active system of claim 10, wherein the controller is separate from a turbine controller of the wind turbine.

13. The active system of claim 10, further comprising a slip ring providing the fluid communication between the ultrasonic sound emitting device and the compressor.

14. The active system of claim 10, further comprising a transducer mounted between the ultrasonic sound emitting device and the compressor.

15. The active system of claim 10, further comprising a solenoid valve mounted between the ultrasonic sound emitting device and the compressor, the solenoid valve configured to provide the fluid flow from the compressor to the ultrasonic sound emitting device at a predetermined pulse rate.

16. A wind turbine, comprising:

a tower;

a nacelle mounted on the tower;

a rotor coupled to the nacelle, the rotor including a hub and at least one rotor blade extending from the hub;

an ultrasonic sound emitting device mounted on or within one of the tower, the nacelle, the hub, or the at least one rotor blade, the ultrasonic sound emitting device including an inlet, an outlet, and a converging section extending between the inlet and the outlet, the inlet, the outlet and the converging section being defined by outer walls of the ultrasonic sound emitting device, a compressor in fluid communication with the ultrasonic sound emitting device, the compressor configured to supply a fluid flow to the inlet of the ultrasonic sound emitting device; and a controller coupled to the ultrasonic sound emitting device and the compressor, the controller operable to determine if an operating condition exists based on at least one indicator and to activate the compressor to supply the fluid flow to the inlet of the ultrasonic sound emitting device at a predetermined pulse rate if the operating condition exists, wherein the ultrasonic sound emitting device is configured to accelerate the fluid flow derived from the compressor through the converging section and the outlet such that an ultrasonic sound emission is produced by the ultrasonic sound emitting device.

17. The wind turbine of claim 16, wherein the compressor is disposed within the tower of the wind turbine.

18. The wind turbine of claim 16, wherein the compressor is disposed on a platform of the tower.

19. The wind turbine of claim 18, wherein a damper layer is disposed between the compressor and the platform.

* * * * *